United States Patent

Ghisler

[11] Patent Number: 5,926,755
[45] Date of Patent: Jul. 20, 1999

[54] METHOD AND AN ARRANGEMENT FOR CONDUCTING MULTIPLE CALLS SIMULTANEOUSLY

[75] Inventor: Walter Ghisler, Upplands Väsby, Sweden

[73] Assignee: Telefonaktiebolaget LM Ericsson, Stockholm, Sweden

[21] Appl. No.: 08/693,549

[22] Filed: Aug. 7, 1996

Related U.S. Application Data

[51] Int. Cl.⁶ .............................. H04M 3/42; H04Q 7/20
[52] U.S. Cl. ....................... 455/414; 455/463; 455/464; 455/455; 455/450; 455/555; 370/442
[58] Field of Search .................................. 455/466, 555, 455/554, 414, 403, 422, 450–455, 463, 464; 370/442, 493, 494, 495, 915, 329, 336, 337, 345, 347, 348, 524, 522, 321, 322

[56] References Cited

U.S. PATENT DOCUMENTS

| | | | |
|---|---|---|---|
| 3,898,390 | 8/1975 | Wells et al. | 455/438 |
| 4,238,849 | 12/1980 | Gassmann | 370/493 |
| 4,646,345 | 2/1987 | Zdunek et al. | |
| 4,731,812 | 3/1988 | Akerberg | 455/555 |
| 4,815,073 | 3/1989 | Grauel et al. | 370/95 |
| 5,044,010 | 8/1991 | Frenkiel et al. | 455/464 |
| 5,159,702 | 10/1992 | Aratake | 455/464 |
| 5,170,488 | 12/1992 | Furuya | 455/555 |
| 5,182,753 | 1/1993 | Dahlin et al. | |
| 5,299,198 | 3/1994 | Kay et al. | 370/95.3 |
| 5,319,634 | 6/1994 | Bartholomew et al. | 370/442 |
| 5,511,072 | 4/1996 | Delprat | 370/336 |
| 5,513,248 | 4/1996 | Evans et al. | 455/465 |
| 5,530,736 | 6/1996 | Comer et al. | 455/554 |
| 5,533,027 | 7/1996 | Akerberg et al. | 370/195.1 |
| 5,633,873 | 5/1997 | Kay et al. | 455/450 |
| 5,666,398 | 9/1997 | Schiffel et al. | 370/280 |
| 5,677,942 | 10/1997 | Meier | |
| 5,687,194 | 11/1997 | Paneth et al. | 455/466 |
| 5,703,881 | 12/1997 | Kay et al. | 370/468 |
| 5,703,933 | 12/1997 | Ghisler | 455/422 |
| 5,740,166 | 4/1998 | Ekemark et al. | 370/321 |
| 5,754,555 | 5/1998 | Hurme et al. | 370/522 |

FOREIGN PATENT DOCUMENTS

0 583 233  2/1994  European Pat. Off. .

Primary Examiner—Dwayne D. Bost
Assistant Examiner—Tracy M. Legree
Attorney, Agent, or Firm—Burns, Doane, Swecker & Mathis, L.L.P.

[57] ABSTRACT

In a radio communication system including at least one radio base station and at least two telephones connected to a radio terminal, simultaneous multiple calls may be set up between the radio base station and the radio terminal. An adaptor connects the telephones to the radio terminal that is connected over a radio air-interface to the radio base station. For an outgoing call originating from one of the telephones, the adaptor senses when a particular telephone goes off-hook and signals this information to the radio base station via the radio terminal and a control channel of the radio air-interface. Then, a first traffic channel is set up between the radio base station and the radio terminal. The telephone that has gone off-hook is connected to the established traffic channel via an adaptor. Once a first traffic channel is established for a first call, signalling that a second call is to be set up may be transmitted across the first traffic channel without terminating the first call. The second call is then set up on a different traffic channel.

14 Claims, 7 Drawing Sheets

| Information element | Type | Length (bits) |
|---|---|---|
| Protocol Discriminator | M | 2 |
| Message Type | M | 3 |
| Request Number | M | 4 |
| Remaining Length | M | 5 |
| Parameter Type (Digit) | O | 4 |
| Number of values | O | 5 |
| 1st digit | O | 4 |
| 2nd digit | . | . |
| . . | . | . |
| . . | . | . |
| 32nd digit | O | 4 |
| Parameter Type (Feature indicator) | O | 4 |
| Number of Values | O | 5 |
| Feature indicator | O | 4 |

| Code | Parameter Type |
|---|---|
| 0001 | Digit |
| 0010 | Feature indicator |

FIG. 7

| Information element | Type | Length (bits) |
|---|---|---|
| Protocol Discr. | M | 2 |
| Message Type | M | 3 |
| Remaining Length | M | 5 |
| Parameter Type (Signal) | O | 4 |
| Number Of Values | O | 5 |
| Signal | O | 3 |
| Parameter Type (Calling Number PC) | O | 4 |
| Number of values | O | 5 |
| Calling Number P.C. | O | 4 |
| Parameter Type (Calling Number Digit) | O | 4 |
| Number of values | O | 5 |
| 1st digit | O | 4 |
| 2nd digit | . | . |
| . . | . | . |
| . . | . | . |
| 32nd digit | O | 4 |

| Code | Parameter Type |
|---|---|
| 0001 | Signal |
| 0010 | Calling Number Presentation Code |
| 0011 | Calling Number Digit |

METHOD AND AN ARRANGEMENT FOR CONDUCTING MULTIPLE CALLS SIMULTANEOUSLY

FIELD OF THE INVENTION

The present invention relates to a method and an arrangement for enabling multiple calls to be conducted simultaneously in a telecommunication system. More particularly, the present invention relates to a method and an arrangement for enabling multiple calls to be conducted simultaneously between a radio base station and a single radio terminal.

BACKGROUND

In a conventional wire-bound telephone network each subscriber is provided with a pair of copper wires for communication. The copper wires connect the subscriber point-to-point to a local exchange or switch and then to another subscriber. These copper wires are expensive to install and maintain. Furthermore, each pair of copper wires typically has only enough bandwidth to handle one conventional unmodulated call at a time.

Attempts have been made to enable a subscriber terminal to handle more than one call at a time across a wire-bound network. One known approach is the "call waiting" procedure. According to this procedure, in a wire-bound Public Switched Telephone Network (PSTN), when an incoming call finds a telephone busy with an ongoing call, a "door knocking signal" informs the communicating parties in the ongoing call that an incoming call is waiting. Because of the limited bandwidth of the copper wires, the called party must park the ongoing call to switch to the incoming call. The called party may then switch back to the ongoing call. A problem with this approach is that in many cases the ongoing call is important, and the called party may be unwilling to park the ongoing call, thereby making access by the incoming call impossible.

There is also a problem associated with making an outgoing call from a telephone in a wire-bound network if the telephone line is already being used by another telephone. If a telephone line is in use it is not possible to start a new call without interrupting or terminating the ongoing call.

A digital (so-called "2B+D") interface has been developed which allows two calls to be conducted simultaneously over a single pair of wires using 2 times 64 or 128 Kbits/second for the actual communication and 16 Kbits/second for signalling. This interface is limited to only allowing two calls to be conducted simultaneously.

As an alternative to copper wires, Radio in the Local Loop (RLL) systems have been designed to replicate the functions of the wire-bound subscriber network. Typically, these types of systems employ radio terminals that are fixedly installed to allow communication to and from subscribers. The radio terminals communicate with radio base stations over a radio air-interface, the radio base stations being interfaced with the PSTN. In this way, the radio air-interface takes the place of the copper wires in the wire-bound network, over a portion of the communication pathway. As will be appreciated, RLL systems have particular applicability in areas where it is difficult (or not cost efficient) to run wiring, e.g., in rural areas or inside office buildings. The radio terminals used in RLL systems can be similar to the mobile radio terminals used in cellular radio telephone systems.

A problem with RLL systems is that the RLL terminals, like the wire-bound terminals, can handle only one call at a time. This is partly due to the nature of traffic channels and control channels in radio systems. In radio systems, traffic channels carry speech or user data between a radio terminal and a radio base station, whereas control channels are used for setting up traffic channels and do not carry traffic. There are several different types of control channels, such as paging channels which are used for signalling downlink from the radio base station, and access channels which are used for signalling uplink towards the radio base station. Control channels between a radio base station and a radio terminal are used by a radio terminal when the terminal is not communicating on a traffic channel, for example, when first setting up a call. Therefore, where there is a call going on via a traffic channel between a radio terminal and a radio base station, the radio terminal cannot set up a second independent call using a control channel.

Thus, while RLL terminals permit a subscriber to include a third party in an ongoing call or park an ongoing call to contact a third party, these terminals are limited to transmitting or receiving one call at a time. If a subscriber wants to be able to transmit or receive more than one call at a time, another subscription must be obtained and another terminal must be installed, doubling the cost as compared to a single subscription.

SUMMARY

The present invention overcomes the afore-described problems by using the traffic channel of a first call between a radio base station and a first telephone connected to a radio terminal to perform the signalling required for setting up a second independent call between the radio base station and a second telephone connected to the same radio terminal.

According to the present invention, multiple calls can be transmitted and received simultaneously via a single radio terminal. According to one embodiment, multiple calls may be set up between a radio base station and multiple telephones via a radio terminal. The radio terminal is connected over a radio air-interface to the radio base station. When a first call is to be set up, a control channel is accessed between the radio terminal and the radio base station, and the first call is set up between the radio base station and the radio terminal on a traffic channel. A second call may be set up between the radio base station and the radio terminal, without terminating the first call, by signalling over the established traffic channel of the first call. The second call is then set up on a second traffic channel.

According to the present invention, an adaptor connects the multiple telephones to the radio terminal. For an outgoing first call originating from one of the telephones, the adaptor senses when a particular telephone goes off-hook and signals this information to the radio base station via the radio terminal and a control channel of the radio air-interface. Then, a first traffic channel is set up between the radio base station and the radio terminal. The telephone that has gone off-hook is connected to the established first traffic channel via the adaptor.

For an incoming first call, the radio terminal receives an alert order on a control channel from the radio base station and alerts at least one of the telephones, via the adaptor, to go off-hook. When it is detected that one of the telephones has gone off-hook, the adaptor signals this information to the radio base station via the radio terminal and a control channel of the radio air-interface. A first traffic channel is then set up between the radio base station and the radio terminal. The telephone that has gone off-hook is connected to the established first traffic channel via the adaptor.

Once a traffic channel has been set up for a first outgoing call or a first incoming call, an independent second outgoing or incoming call may be set up between the radio base station and the radio terminal by signalling over the existing traffic channel. For a second originating call, the signalling may be an uplink message signalling from the radio terminal to the radio base station that a second telephone has gone off-hook. For a second incoming call, the signalling may be a downlink alert message from the radio base station to the radio terminal, causing ringing on one of the telephones that is still on-hook, whereafter that telephone may go off-hook. A second connection is then established on a second traffic channel between the radio base station and the radio terminal, and the second call is set up.

One advantage of the present invention is that several simultaneous incoming and/or outgoing calls may be handled by one radio terminal in an RLL system using an existing cellular standard interface or a slightly modified cellular standard interface, without defining a new radio air-interface designed specifically for RLL.

Another advantage of the present invention is that tedious procedures for parking calls and alternating between calls are avoided when handling multiple calls. Also, simultaneous independent calls may be conducted for very little additional cost. Thus, the present invention outperforms the wire bound telephone networks.

Still another advantage of the present invention is that the average set up times for calls in an RLL network are shortened because all second and subsequent calls may be set up by signalling directly to/from the desired radio base station on an existing traffic channel rather than first performing an access on a control channel.

BRIEF DESCRIPTION OF THE DRAWINGS

The invention will now be described with reference to the figures, wherein.

DETAILED DESCRIPTION

Figure 1A:
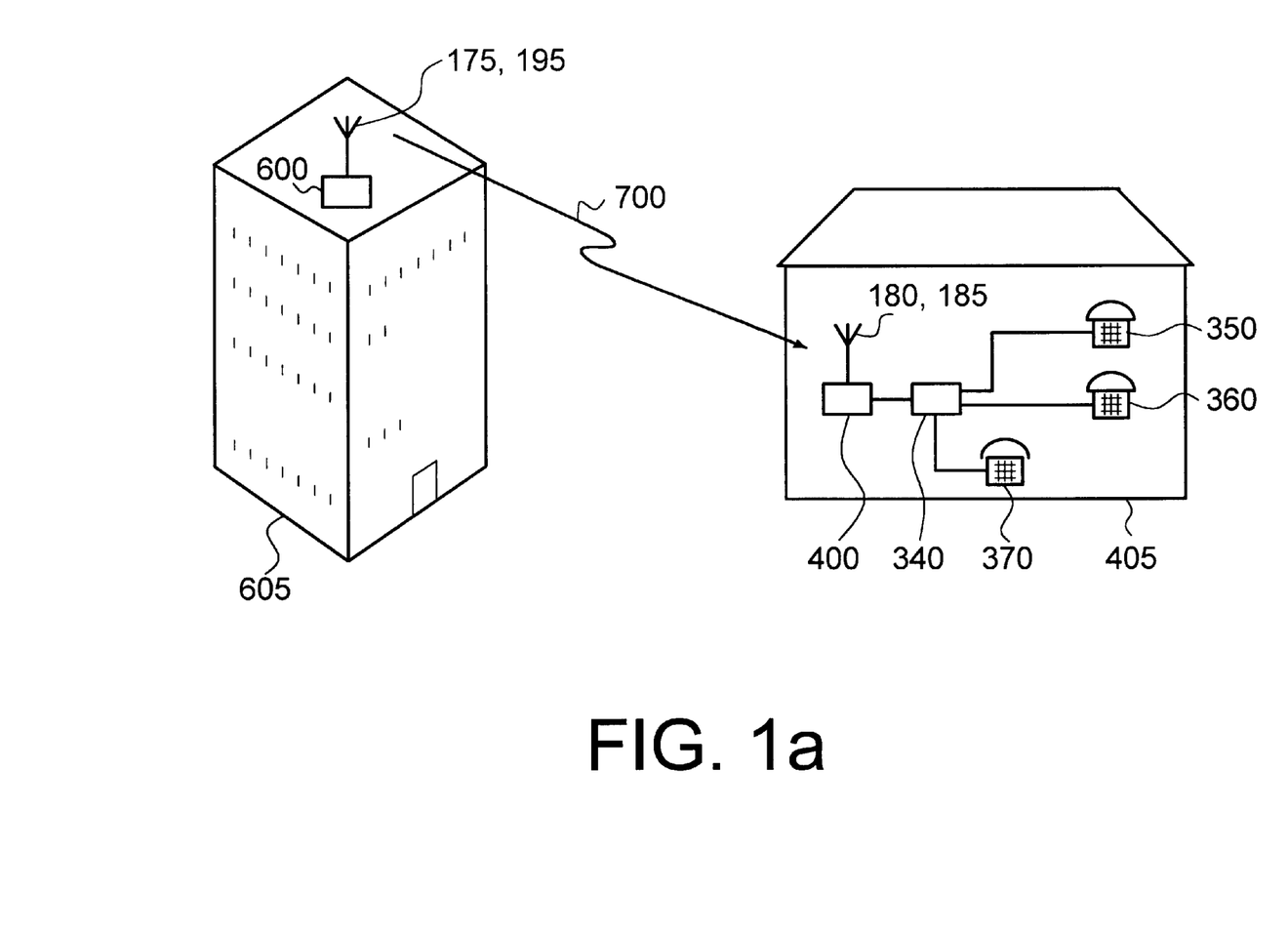
FIG. 1*a* illustrates a Radio in the Local Loop system according to the present invention.

FIG. 1*a* illustrates an RLL system according to the present invention. Referring to FIG. 1*a*, the RLL system comprises a radio base station 600 placed, for example, on the roof of a high building 605, and a fixed radio terminal 400 placed, for example, in a house 405. The radio base station 600 includes antennas 175 and 195, and the fixed radio terminal 400 includes antennas 180 and 185. The radio base station 600 and the fixed radio terminal 400 communicate with each other via the antennas 175, 195, 180 and 185 and the radio air-interface 700.

As shown in FIG. 1*a*, the fixed radio terminal 400 serves a number of "plain old telephones" (POTs) 350, 360 and 370 via an adaptor 340. The radio base station 600, the radio air-interface 700, the radio terminal 400, and the adaptor 340 enable users in the house 405 to perform simultaneous incoming and outgoing calls via the three POTs 350, 360, and 370 as described in more detail below. This is an improvement over conventional wire-bound systems and RLL systems that enable only one call at a time to be performed via the connection of one wire-bound terminal or one radio terminal to the network.

Conventional air-interfaces of cellular mobile radio systems do not provide signalling for setting up more than one simultaneous call between one mobile radio terminal and one radio base station because there is no need for such a facility. However, when using a mobile radio terminal as a fixed terminal, for example in a house, a new situation arises in which several users in several separate rooms in the house may want to perform independent calls via separate telephone terminals (POTs) connected to the fixed radio terminal via an adaptor. The present invention addresses this new requirement.

Figure 1B:
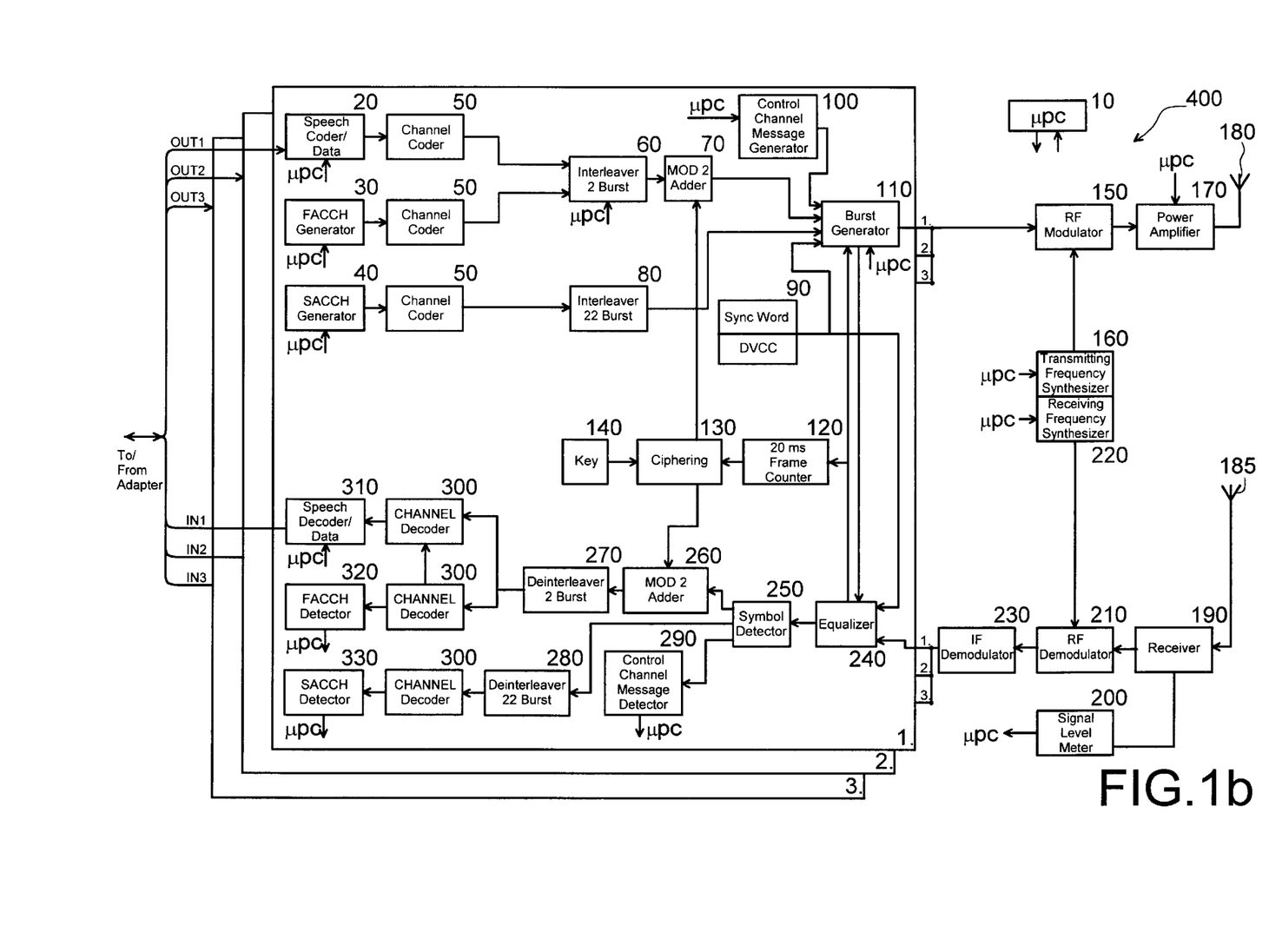
FIG. 1*b* illustrates a digital radio terminal according to one embodiment of the present invention.

FIG. 1*b* illustrates a digital radio terminal according to one embodiment of the present invention. The digital radio terminal shown 400 in FIG. 1*b* can handle multiple calls simultaneously. As shown in the left portion of FIG. 1*b*, the radio terminal includes three printed circuit (PC) boards 1., 2., and 3., each associated with circuitry used to process a different radio channel and each capable of handling one independent call via one POT. For example, the three boards 1., 2. and 3. permit three calls transmitted at the same carrier frequency but in different time slots or channels to be simultaneously handled. The boards 2. and 3. contain the same elements shown as part of board 1. As shown in the right portion of FIG. 1*b*, the radio terminal also includes a common radio part used by all three boards. Power control of the transmit amplifier as well as time alignment may be performed in common for the three simultaneous calls because the distance between the terminal and the radio base station is the same for the calls.

Referring to FIGS. 1*a* and 1*b*, below is a detailed description of an uplink path of a connection, i.e., from the radio terminal to the radio base station, and a downlink path of a connection, i.e., from the radio base station to the radio terminal.

When uplink data is to be transmitted from a telephone terminal to a radio base station, an analog signal, for example a human voice, is received from the telephone terminal via an adaptor. The adaptor and the telephone terminals are shown in detail below with reference to FIG. 2. The analog signal is received from one of the two wire output lines OUT1–OUT3 at the Speech Coder 20. The analog signal is converted into a digital bit data stream in response to control signals from a micro processor controller ($\mu$pc) 10 that controls the radio terminal activities and the radio base station communication.

The digital bit data stream is divided into data packages, according to, for example, the Time Division Multiple Access (TDMA) principle. The TDMA principle provides radio subscribers with radio channels by assigning each connection to a time slot on a carrier frequency.

A Fast Associated Control Channel (FACCH) generator 30 provides a blank and burst channel for sending control and supervision messages from the radio terminal to the radio base station. Based on control signals from the μpc 10, a FACCH message is transmitted in a speech frame in place of a user frame comprising speech and data. A Slow Associated Control Channel (SACCH) generator 40 provides a continuous channel for the exchange of signaling messages (typically less urgent than those transmitted on the FACCH) between the radio terminal and the radio base station. A fixed number of bits, for example 12, is allocated to the SACCH in each time slot. An SACCH message is transmitted based on control signals from the μpc 10.

Channel Coders 50 manipulate the data from the Speech Coder 20, the FACCH generator 30, and the SACCH generator 40 for error detection and correction. The Channel Coders 50 perform convolutional encoding to protect important data bits in the data. The Channel Coders 50 also encode a Cyclic Redundancy Check (CRC) on the data.

A 2 Burst Interleaver 60 selects data from either the Speech Coder 20 or the FACCH generator 30 in response to orders from the μpc 10. The Interleaver 60 interleaves the selected data over two time slots. This interleaving is performed to reduce the effects of fading of the radio signal in the radio air-interface. This fading, sometimes referred to as Rayleigh fading due to its statistical distribution, is caused by reflections of some portions of the radio signal onto other portions of the radio signal, which may in turn cause the radio signal to be cancelled out. To reduce the effects of Rayleigh fading, the 2 Burst Interleaver 60 stretches the selected data over two time slots, so that the time slots contain overlapping data. For example, 260 data bits that may constitute a first transmitting word are divided into two equal parts and allotted two consecutive time slots. Then, 260 bits that constitute the next transmitting word are divided into two equal parts. One of the parts is allotted the last time slot that was allotted in part to the first word, and the other part is allotted to the next consecutive time slot. In this way, if data is lost in one time slot due to Rayleigh fading, it can be reconstructed using the adjacent time slot.

The interleaved data is delivered from the 2 Burst Interleaver 60 to a Mod 2 Adder 70 where it is ciphered bit-by-bit by logical modulo-two-addition of a pseudo-random bit stream generated by the Ciphering unit 130. The Ciphering unit 130 includes a sequencer for updating the Ciphering code. The 20 millisecond (ms) Frame Counter 120 updates the ciphering code in the Ciphering unit 130 every 20 ms, once for every transmitted frame. A Key unit 140 generates a unique key for each subscriber to control the ciphering.

Data transmitted from the SACCH generator 40 via the Channel Coder 50 is interleaved by a 22 Burst Interleaver 80. The 22 Burst Interleaver 80 interleaves the SACCH data over 22 time slots, each consisting of, for example, 12 bits of information. The SACCH data is interleaved according to the diagonal principle, in which two SACCH messages are interleaved in parallel by delaying one message. For example, the second message is delayed by 11 bursts compared to the first message. This interleaving, like the interleaving performed by the 2 Burst Interleaver, reduces the effects of Rayleigh fading.

A Sync Word/DVCC generator 90 generates a synchronization word and a Digital Verification Color Code (DVCC). The synchronization word may, for example, comprise 28 bits. It is used for time slot synchronization and identification and also for equalizer training. Three different slot identifiers are defined, one for each time slot, and another three may be reserved for other purposes. The DVCC may, for example, comprise 8 bits. It is sent by the radio base station to the radio terminal and vice-versa. The DVCC is used for assuring that the correct channel is decoded.

A Control Channel Message Generator 100 generates control channel messages according to orders received from the μpc 10.

A Burst Generator 110 generates two kinds of bursts, a voice/traffic channel burst and a control channel burst, depending on the state of operation. The voice/traffic channel burst is configured by integrating control messages generated by the Control Channel Message Generator 100, ciphered data from the Mod 2 Adder 70, interleaved data from the 22 Burst Interleaver 80, the sync word and the coded DVCC, and delimiter bits according to the time slot format specified by, for example, the Electronic Industries Association and the Telecommunications Industry Association Interim Standards (EIA/TIA IS-54). For example, the voice/traffic channel burst may include a ciphered data word of 260 bits, SACCH of 12 bits, a 28 bit sync word, 12 bits of coded DVCC and 12 delimiter bits. In the control channel burst, the ciphered data and SACCH data are replaced with data generated by the Control Channel Message Generator 100. The number of delimiter bits may be increased to avoid time overlap. The transmission of a burst from the Burst Generator 110 is synchronized with the transmission of other time slots and adjusted for timing by an Equalizer 240.

An RF Modulator 150 modulates the data from the Burst Generator 110 with a carrier frequency generated by a Transmitting Frequency Synthesizer 160 according to the transmitting channel selected by the μpc 10. The data may be modulated according to the conventional π/4 shifted, Differentially Encoded Quadrature Phase Shift Keying (DQPSK) method. According to the DQPSK method, the data is differentially encoded, that is two bits symbols are transmitted as four possible changes in phase: ±π/4 and ±3π/4.

A power amplifier 170 amplifies the modulated RF signal at a level selected on command by the μpc 10. The amplified signal is sent across the radio air-interface to the radio base station via an antenna 180.

On the receiving side, a signal representing an incoming call is received from the radio base station by the Receiver 190 via an antenna 185. The strength of the received signal from the Receiver 190 is measured by the Signal Level Meter 200, and this information is sent to the μpc 10. The μpc 10 makes decisions according to received messages and measurement information.

The RF Demodulator 210 demodulates the signal from the Receiver 190 to produce an intermediate frequency using the receiver carrier frequency generated by the Receiving Frequency Synthesizer 220 according to the receiving channel selected by the μpc 10. The intermediate frequency is demodulated by the IF Demodulator 230 to restore the original π/4 DQPSK modulated digital information.

The Equalizer 240 performs adaptive equalization of the demodulated signal to improve signal quality. A correlator within the Equalizer 240 adjusts to the timing of the received bit stream and synchronizes the Burst Generator 110 to the timing. Also in the Equalizer 240, the sync word and the DVCC are checked for identification purposes.

A Symbol Detector 250 converts the received 2-bit symbol format into a single bit data stream. A Mod 2 Adder 260 deciphers the data stream bit-by-bit by logical modulo-two-addition of a pseudo-random bit stream generated by the Ciphering unit 130. A 2 Burst Deinterleaver 270 reconstructs the speech data and FACCH data by assembling and rearranging information from two consecutive time slots. A 22 Burst Deinterleaver 280 reassembles and rearranges the SACCH data that is spread over 22 consecutive time slots. A Control Channel Message Detector 290 detects control channel messages and sends them to the $\mu$pc 10 across a control line.

The Channel Decoders 300 decode the encoded data using the reverse principle of coding used by the Channel Coders 50. The received CRC bits are checked to determine if any error has occurred. The Channel Decoder that decodes the FACCH data further detects the distinction between speech data and FACCH information and directs the Channel Decoder that decodes the speech signals accordingly.

The Speech Decoder 310 processes the received data according to a speech coder algorithm, for example the conventional VSELP algorithm, and generates the received analog speech signal. The analog signal may be enhanced by filtering techniques. The analog signal is finally transmitted to the voice terminal for which the incoming information was intended via input lines IN1–IN3. The FACCH Detector 320 and the SACCH detector 330 detect FACCH and SACCH messages, respectively, and transfer these messages to the $\mu$pc 10.

When no sending or receiving is occurring in the radio terminal, measuring on other frequencies allows handoff of the radio terminal from one frequency to another to take place. The radio terminal, under direction from the radio base station, measures signal quality of specified RF channels and forwards these measurements to the radio base station upon request to assist in transferring the radio terminal from one frequency to another.

Figure 2:
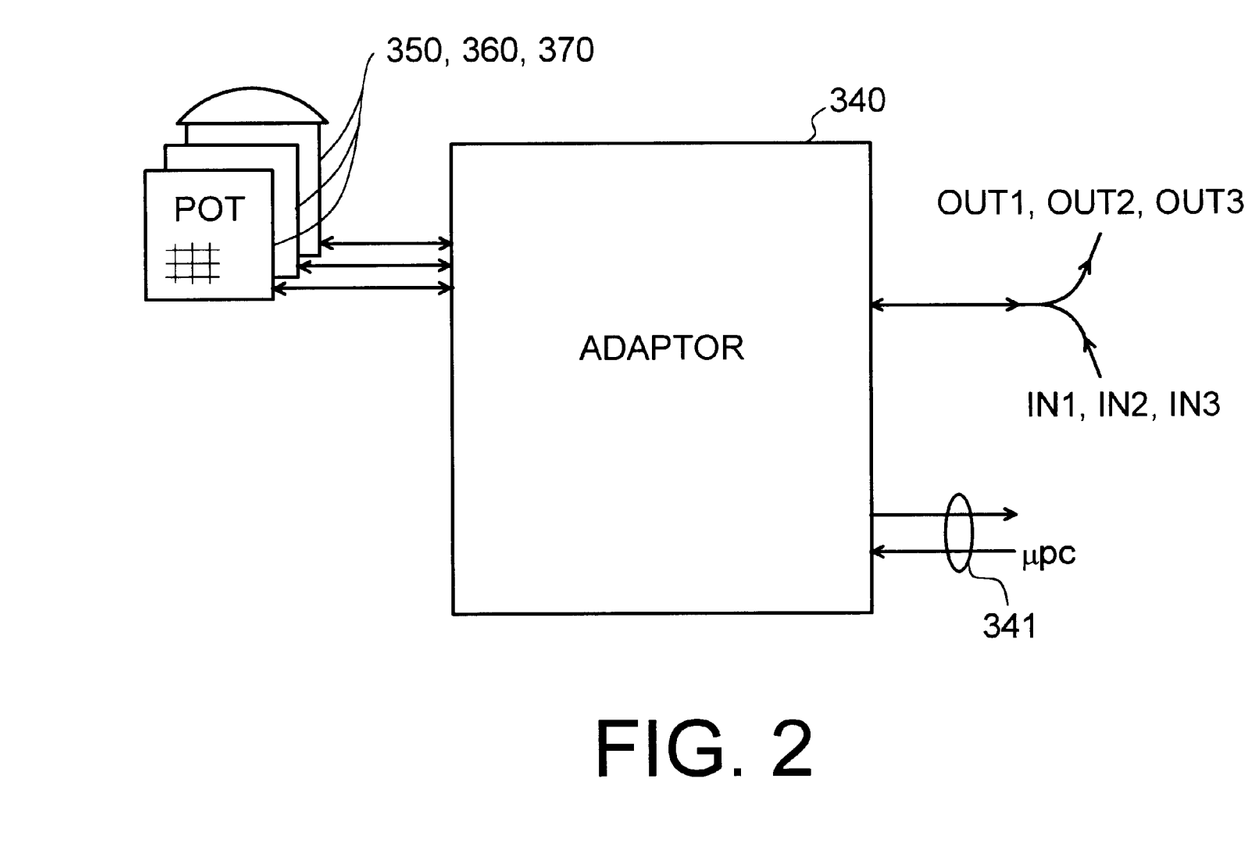
FIG. 2 illustrates an adaptor and telephone terminals that may be employed in conjunction with the digital radio terminal illustrated in FIG. 1*b* according to one embodiment of the present invention.

FIG. 2 illustrates an adaptor and telephone terminals that may be employed in conjunction with the digital radio terminal illustrated in FIG. 1b, according to one embodiment of the present invention. FIG. 2 illustrates an adaptor 340 connected to, for example, (POTs) 350, 360 and 370. The adaptor 340 connects the POTs 350, 360, and 370 to the digital radio terminal shown in FIG. 1b via the input lines IN1–IN3 and the output lines OUT1–OUT3. The adaptor 340 may be a separate device from the radio terminal, as shown in FIG. 2, or may be incorporated in the radio terminal. The adaptor connects incoming transmissions to the POTs via the input lines IN1–IN3 and connects outgoing transmissions from the POTs via the output lines OUT1–OUT3. The output lines OUT1–OUT3 are in turn connected to the conventional Speech Coder 20, and the input lines INI–IN3 are connected to the Speech Decoder 310.

According to the present invention, independent and simultaneous calls may be set up using the POTs 350, 360 and 370 and the adaptor 340. The POTs are only illustrated as an example. Calls may also be set up using other devices, for example a modem or a fax machine. The use of the term "telephone" is thus intended to mean any type of subscriber terminal.

The adaptor 340 comprises circuitry for sensing an on-hook/off-hook state of the POTs 350, 360 and 370 and for signalling the state to the radio base station via the radio terminal and the radio air-interface. Upon sensing an off-hook state of one of the POTs, a traffic channel is established between the radio base station and the radio terminal. Details of an adaptor are provided in the commonly assigned U.S. patent application Ser. No. 08/646,532 to Walter Ghisler, filed on May 10, 1996, and herein incorporated by reference.

The adaptor 340 receives and sends control signals to the $\mu$pc 10 across a control signal line 341. For example, the adaptor 340 sends the on-hook/off-hook information regarding the POTs 350, 360 and 370 to the $\mu$pc 10, and the $\mu$pc 10 orders the setting up and the disconnecting of more than one simultaneous call based on this information.

For first outgoing calls, the adaptor 340 senses when a particular POT has gone off-hook and signals this information to the radio base station 600 via the radio terminal 400 and the radio air-interface 700. When a first POT goes off-hook, this indicates that a first call is to be set up. The following description reiterates the setting up of a call disclosed in the above-referenced application.

The adaptor 340 requests from the $\mu$pc 10, via the control signal line 341, that a traffic channel be set up to the radio base station and that a connection be set up from the radio base station to an exchange in the PSTN. This exchange is specified by a first B-number stored previously in the adaptor. The $\mu$pc 10 sends, via the Control Channel Message Generator 100, a message on the appropriate uplink control channel (the access channel) that a traffic channel is desired. This message includes the first B-number received by the $\mu$pc 10 from the adaptor 340 indicating the identity of an exchange in the PSTN that later in the flow will receive the subscriber signalling (second B-number). The radio base station 600 selects a traffic channel, informs the $\mu$pc 10 via the Control Channel Message Detector 290 of the traffic channel identity (frequency and time slot), and sets up this traffic channel between the radio terminal and the radio base station. The radio base station also sets up a connection to the exchange in the PSTN (not shown) indicated by the first B-number.

The adaptor 340 connects the POT that has gone off-hook on the established first traffic channel to the radio base station via one of the output lines OUT1–OUT3 and on one of the input lines IN1–IN3 of the radio terminal. In this way, a first full duplex outgoing connection is set up from the POT to the radio base station.

After the outgoing connection is set up, subscriber signalling takes place. The subscriber inputs on the keypad of the POT the telephone number of the subscriber he or she wants to call (the second B-number). This information is normally received as Dual Tone Multiple Frequency (DTMF) signals by the adaptor 340 from the POT and is digitally encoded and sent to the $\mu$pc 10 via the control signal line 341. The $\mu$pc 10 then signals the second B-number to the radio base station via the traffic channel from where it is transmitted to the exchange in the PSTN.

For first incoming calls, the radio base station 600 sends a page to the radio terminal 400 on the appropriate control channel (the paging channel the radio terminal listens to). The $\mu$pc 10 that receives the page via the Control Channel Message Detector 290 sends to the adaptor, via the control signal line 341, an alert order causing simultaneous ringing on all the POTs. When the adaptor 340 senses that one of the POTs has gone off-hook, the adaptor signals this information to the radio base station via the radio terminal and the radio air-interface. The radio base station assigns a first traffic channel for the incoming call, and the first traffic channel is set up between the radio base station and the radio terminal. The adaptor 340 connects the POT that has gone off-hook on the established first traffic channel to the radio base station via one of the input lines IN1–IN3 and one of the output lines OUT1–OUT3 of the radio terminal. In this way, a first incoming call is set up from the radio base station to one of the POTs.

If a call is ongoing, the control channel is not available for signalling between the radio base station and the radio terminal. According to the present invention, when a new independent call is to be set up while another call is ongoing, line signalling, such as off-hook (uplink signal) or alert (downlink signal), is sent on the established traffic channel of the ongoing call. For example, if while either an outgoing call or an incoming call is ongoing, the adaptor senses that another POT has gone off-hook indicating that another outgoing call is to be set up, the adaptor signals, via the radio terminal, along the established traffic channel to the radio base station that a new traffic channel may then, for example, be set up. This signalling may be sent in a speech frame as fast associated control channel (FACCH) information by "stealing" a burst on the established traffic channel. The $\mu$pc 10 sends the request for another traffic channel via the FACCH generator 30 to the radio base station 600. Because the speech signal in the ongoing call contains redundant bits, this signalling does not disturb the ongoing call. The new traffic channel may then, for example, be set up in a different time slot of the same carrier frequency.

When a first call between one POT and the radio base station is ongoing, and a new independent incoming call is to be set up, the radio base station sends an alert order to the radio terminal via the same traffic channel in which the ongoing call is being transmitted. This alert order may be sent in a speech frame as FACCH information by "stealing" a downlink burst on the established traffic channel, in a manner similar to that described above for the uplink transmission of an off-hook signal. The alert order is received by the $\mu$pc 10 via the FACCH detector 320 and forwarded to the adaptor 340 via the control signal line 341. The adaptor responds to the alert order by ringing the POTs that are still on hook. If and when one of these POTs goes off-hook, the same procedure described above is applied for setting up a new traffic channel over the radio air-interface for the new independent incoming call.

While a call is ongoing, the subscriber signaling between the radio base station and the radio terminal regarding a new call is transparent to the users in the ongoing call. This signaling is unnoticeable to the users in an ongoing call, even though it is transmitted in the same time slot or traffic channel as the ongoing call.

To ensure that enough time slots are available for communication between the POTs assigned to a particular radio terminal and the radio base station, handoff may be used to free time slots in a desired carrier frequency which are used in the radio base station for other subscribers and to assign them for use with the POTs assigned to the particular radio terminal. To ensure quality, handoff for all calls associated with one terminal on the same TDMA carrier frequency may be performed simultaneously for the calls if there is a disturbance on the carrier frequency used. This simultaneous handoff will provide another carrier frequency for all ongoing calls of the terminal.

According to the present invention, more than one incoming call or outgoing call or a combination of incoming and outgoing calls may be set up simultaneously in different time slots or channels along the same carrier frequency in a single radio terminal. In the example shown in FIG. 2, the adaptor 340 is capable of connecting up to three calls between the POTs and the radio base station, simultaneously, via the radio terminal and the radio air-interface.

Figure 3:
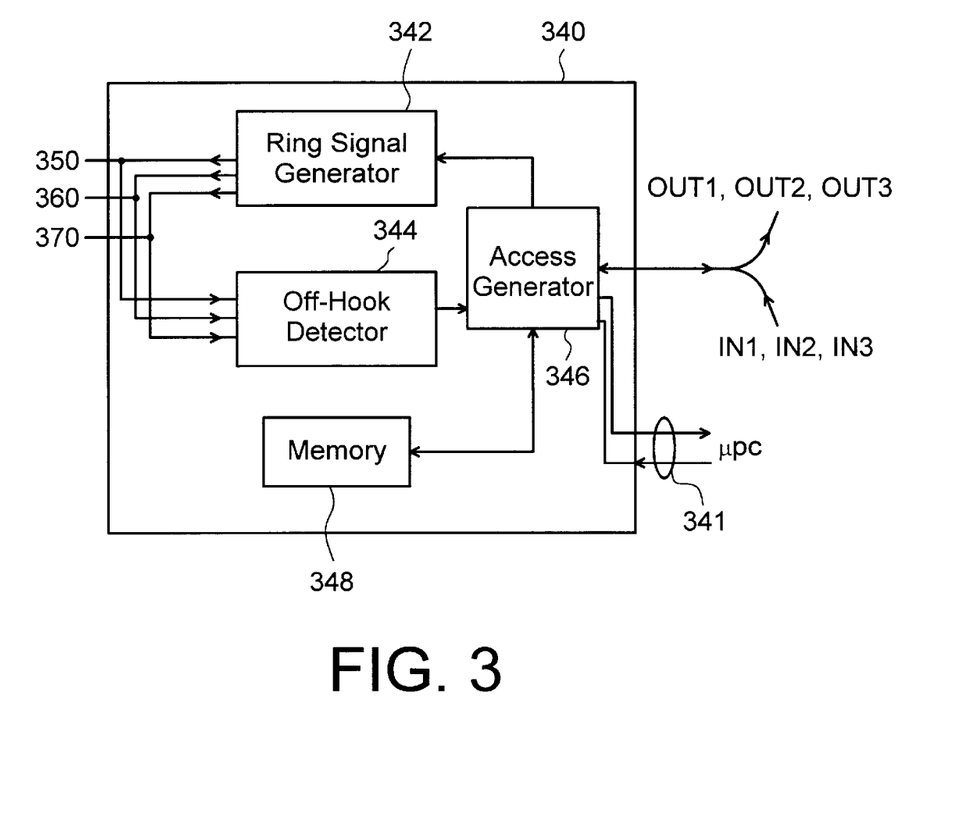
FIG. 3 illustrates in detail the adaptor illustrated in FIG. 2 according to one embodiment of the present invention.

FIG. 3 illustrates in detail the adaptor depicted in FIG. 2 according to one embodiment of the present invention. Referring to FIG. 3, the adaptor 340 connects the POTs 350, 360, and 370 to the radio terminal via the input lines IN1–IN3 and the output lines OUT1–OUT3. The adaptor includes a ring signal generator 342, an off-hook detector 344, an access generator 346, and a memory 348. In the illustrated example, the POTs have keypads for manual dialing, which generates subscriber signalling.

When one of the POTs goes off hook, indicating that a call is to be set up, that POT outputs a hook signal that is detected by the off-hook detector 344. The detected hook signal is delivered from the off-hook detector 344 to the access generator 346, which detects whether or not an alert signal has been delivered from the radio base station. If no alert signal has been delivered, the hook signal is recognized by the access generator 346 as a request to set up an outgoing call from the POT that has gone off-hook. The access generator 346 collects an address from the memory 348, guided by the hook signal. This address points out the exchange in the PSTN to which the outgoing call is to be set up. The access generator 346 indicates to the $\mu$pc 10 over the control signal line 341 that the hook signal has been received and indicates whether any hook signals have been received from any of the other POTs, indicating that other POTs have also gone off-hook. The $\mu$pc 10 sets up the outgoing call based on the off-hook states of the POTs. If this is the first call, the $\mu$pc 10 accesses the control channel to the radio base station via the Control Channel Message Generator 100, asking the radio base station for a first traffic channel to be set up for the call. If, instead, this is a second or further call, the $\mu$pc 10 accesses the already stablished traffic channel via the FACCH generator 30, asking the radio base station for a second or further traffic channel to be set up for the call. In response to the transmission order, a traffic channel is established between the radio terminal and the radio base station in the manner described above.

A dial tone is forwarded from the PSTN to the POT that has gone off-hook on the established traffic channel via the radio base station, the radio air-interface, the radio terminal, and the adaptor. In response to the dial tone, a user manually dials a telephone number for the outgoing call, and this number is delivered by the adaptor to the radio terminal over the control signal line 341 and transmitted via the established traffic channel. A connection between the POT and the desired subscriber is established, and the outgoing call may proceed on the established connection in a conventional manner.

When the access generator 346 of the adaptor 340 receives an alert order on the control signal line 341 from the $\mu$pc 10, this alert order is delivered to the $\mu$pc 10 via the radio air-interface from the radio base station in one of two possible ways. If no call is going on to or from the radio terminal, the alert order is delivered on a control channel, more specifically on a paging channel as known in the art. The alert order is detected in the Control Channel Message Detector 290 and sent to the $\mu$pc 10. When the access generator 346 receives the alert order, it generates signals via ring generator 342 to all the POTs not yet engaged in calls, i.e., those that are still on-hook. When and if one of the POTs goes off-hook in response to the ringing, the procedure for setting up a traffic channel is performed as described above for an originating call. Then, the incoming call is connected to that traffic channel.

Further details of an adaptor are provided in the above-referenced patent application to Ghisler. A difference between the adaptor described in the referenced patent application and the adaptor according to the present invention is that the adaptor according to the present invention serves three POTs, while the adaptor in the referenced application serves one POT. One of ordinary skill in the art would appreciate that there are further differences between the adaptor according to the resent invention and the adaptor described in the referenced application, and no further explanation is considered necessary.

Figure 4:
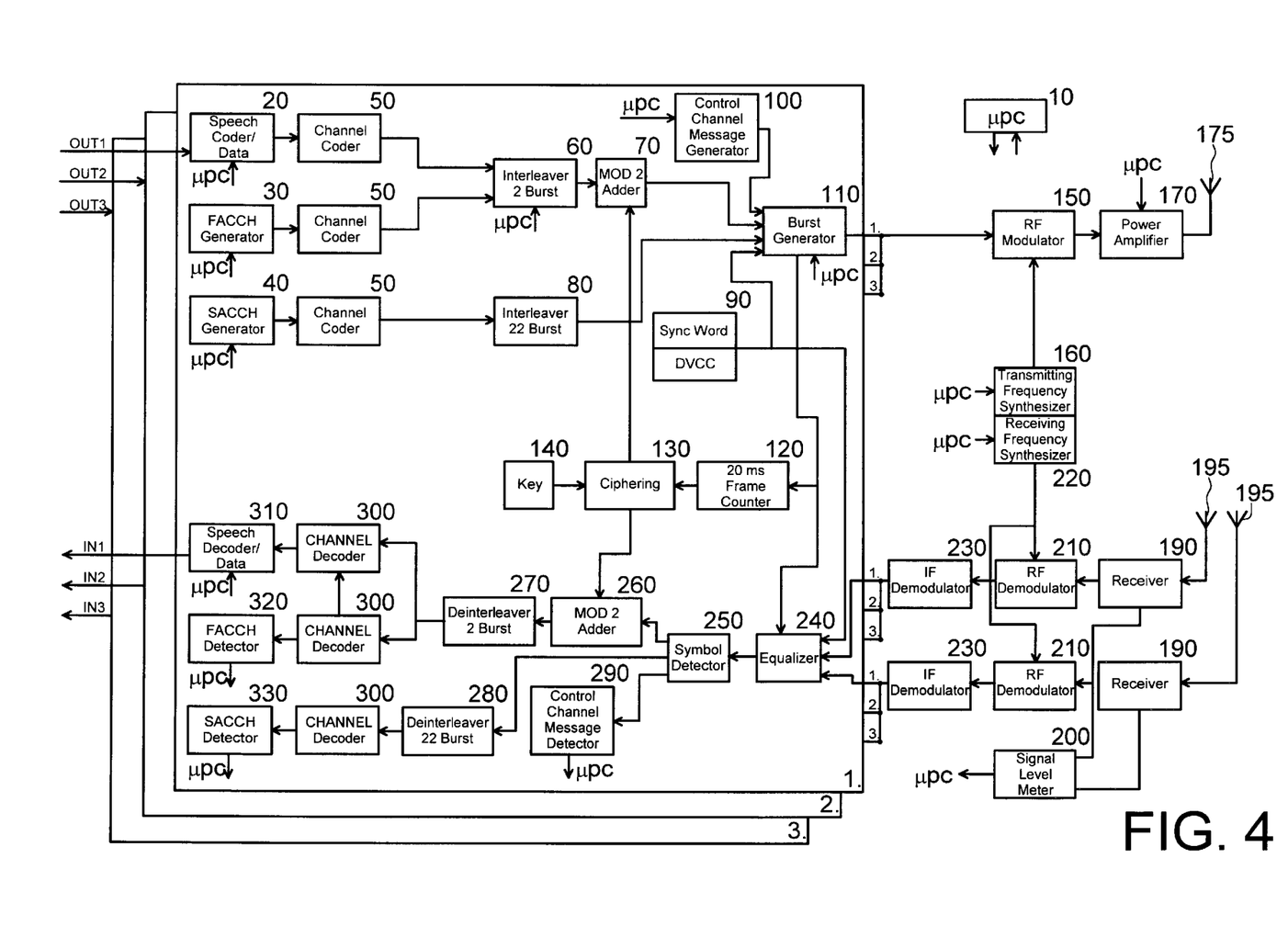
FIG. 4 illustrates a transceiver in a digital radio base station which may be used in conjunction with the digital radio terminal illustrated in FIG. 1*b* according to one embodiment of the present invention.

FIG. 4 illustrates a transceiver in a digital radio base station 600 which may e used in conjunction with the digital radio terminal 400 illustrated in FIG. 1*b* according to one embodiment of the present invention. The transceiver shown in FIG. 4 may be, for example, a Transmitter-Receiver TRX using the EIA-TIA IS-54 cellular standard.

The transceiver shown in FIG. 4 is similar to the digital radio terminal of FIG. 1*b*, and the numbered elements of FIG. 4 are largely the same as those of FIG. 1*b*. For example, similar to the radio terminal 400 in FIG. 1*b*, for a first incoming call, the Control Channel Message Generator 100 generates a control signal, e.g., an alert signal, which is sent on a control channel to the radio terminal. If a call is ongoing, the FACCH generator 30 generates control signals to be transmitted as FACCH information to the radio terminal to set up a new incoming call. For a first outgoing call, the Control Channel Message Detector 290 detects control signals, e.g., off-hook signals, transmitted across a control channel from the radio terminal. If a call is ongoing, the FACCH detector 320 detects a control message from the radio terminal to set up a new outgoing call.

One difference between the digital radio terminal of FIG. 1*b* and the transceiver of FIG. 4 is that the digital radio terminal uses the uplink carrier frequency for sending and the downlink carrier frequency for receiving, whereas the radio base station uses the uplink carrier frequency for receiving and the downlink carrier frequency for sending. In order for the radio terminal shown in FIG. 1*b* to communicate with a radio base station such as that illustrated in FIG. 4, different send and receive frequencies are used. This is achieved by having the send and receive frequencies of the radio terminal swapped in relation to the send and receive frequencies of the digital radio base station. Thus, the digital radio terminal sends at the same frequency that the digital radio base station receives, and the digital radio terminal receives at the same frequency the digital radio base station sends.

Another difference between the digital radio terminal shown in FIG. 1*b* and the transceiver of FIG. 4 is that the digital radio terminal uses one receiving antenna 185 and associated circuitry, whereas the transceiver in FIG. 4 uses two receiving antennas 195 for diversity. Yet another difference is that the digital radio terminal has a wired interface to the adaptor 340, while the transceiver of FIG. 4 has a wired interface (not shown) to the PSTN.

It is also possible to use the time slot of a control channel to carry calls between the radio base station and the radio terminal. When all traffic channels that can be used have been assigned, the time slot of a control channel may be used to set up a call.

When used in conjunction with the radio terminal illustrated in FIG. 1*b* in a RLL system, the transceiver shown in FIG. 4 is the master and the radio terminal shown in FIG. 1*b* is the slave, with regard to frame timing. The μpc 10 controls the radio base station activities and communication with the radio terminal.

Figure 5A:
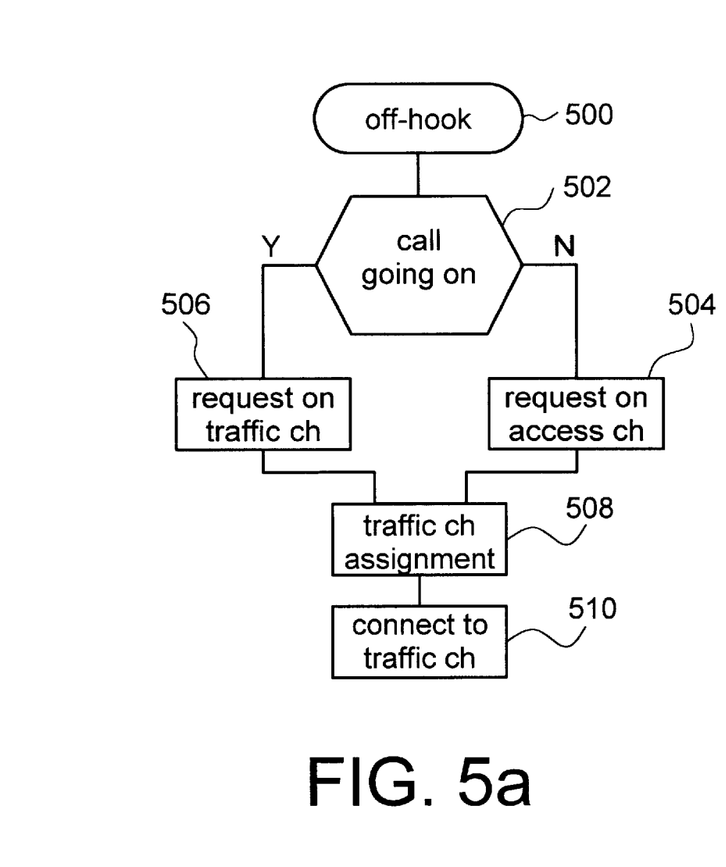
FIGS. 5*a* and 5*b* illustrate procedures for setting up outgoing and incoming calls, respectively, according to one embodiment of the present invention.

FIG. 5*a* illustrates a procedure for setting up an outgoing call originating from one of the POTS, according to one embodiment of the present invention. Referring to FIG. 5*a*, after it is detected that one of the POTs is in an off-hook state at step 500, the radio terminal determines in step 502 if a call is already ongoing. If not, a request is made at step 504 on an access channel or a control channel for setting up a transparent connection between the terminal and the PSTN via the radio base station. If at step 502 it is determined that a call is ongoing, a request is made at step 506 over a traffic channel associated with the ongoing call, e.g., using the FACCH according to the IS-54 standard. The request may be made in the same time slot as the ongoing call. A new traffic channel is assigned at step 508 by the radio base station. If at step 502 it is determined that a call is ongoing, a traffic channel is assigned along the same frequency as the ongoing call. If it is determined at step 502 that a call is not ongoing, a traffic channel is assigned along any desired frequency. At step 510, the adaptor 340 connects the originating POT to the assigned traffic channel, and the PSTN provides an audible register tone via the radio base station to the originating POT, that is the POT among the POTs 350, 360 and 370 that have gone off-hook. Then, the setting up of the call continues according to known procedures.

Figure 5B:
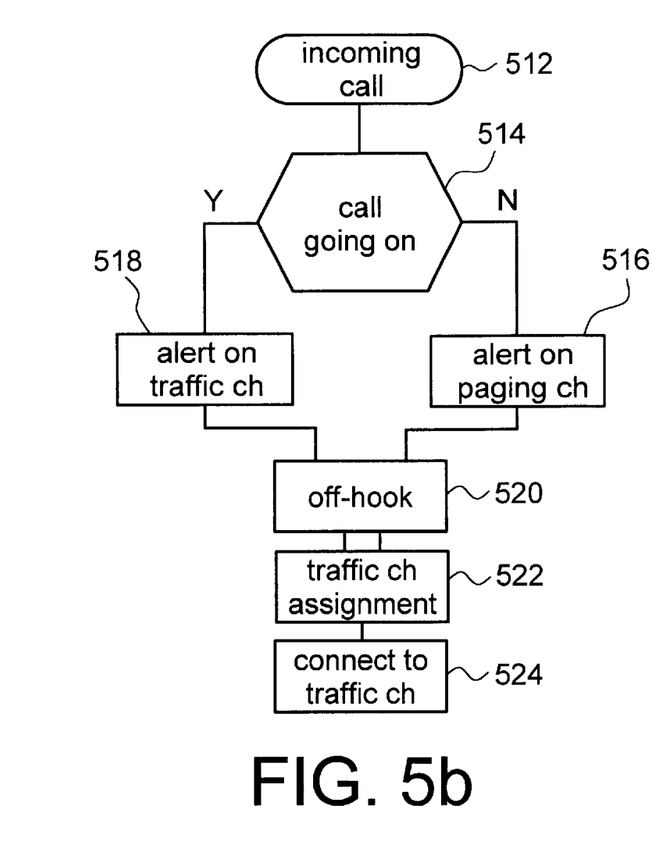

FIG. 5*b* illustrates a procedure for setting up an incoming call terminating at one of the POTs according to one embodiment of the present invention. Referring to FIG. 5*b*, when there is an incoming call at step 512 in the PSTN, the PSTN determines at step 514 if a call is already ongoing involving the addressed subscriber. If not, the PSTN provides in step 516 an alert order over the paging channel of the radio air-interface via the radio base station. If the PSTN determines at step 514 that a call is ongoing, an alert order is sent in step 518 over a traffic channel associated with the ongoing call, e.g., using the FACCH according to the IS-54 standard. Then, ringing towards the POTs which are on-hook is performed, followed by one of the POTs going off-hook in step 520. A traffic channel is then assigned in step 522. If, at step 514, it is determined that a call is already ongoing, a traffic channel is assigned along the same carrier frequency as the ongoing call. If it is determined at step 514 that a call is not ongoing, a new traffic channel is assigned along any desired carrier frequency. In step 524, the POT that has gone off-hook is connected to the traffic channel by the adaptor 340.

Figure 6:
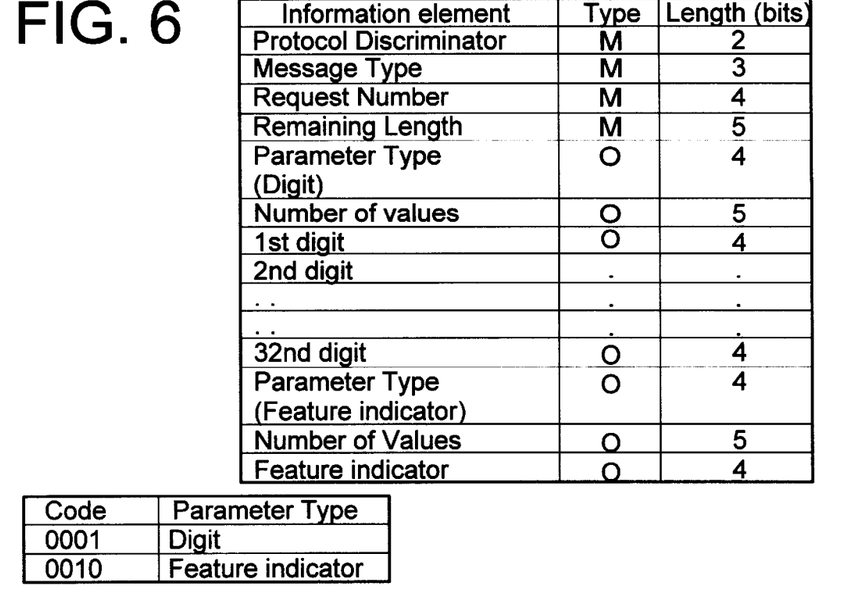
FIG. 6 illustrates an example of a message for signaling an off-hook state from the radio terminal to the radio base station according to one embodiment of the present invention.

FIG. 6 illustrates an example of a message for signaling an off-hook state from the radio terminal to the radio base station according to one embodiment of the present invention. The message shown in FIG. 6 is a FLASH WITH INFO message according to the IS-54 standard. When an outgoing call is to be set up while a call is ongoing, the outgoing call may be defined as a special service according to the IS-54 standard. The message signalling an off-hook state indicating that the outgoing call is to be set up is sent via the signaling path of a traffic channel of an already ongoing call from a radio terminal to the radio base station indicating that a user desires to invoke a special service.

Figure 7:
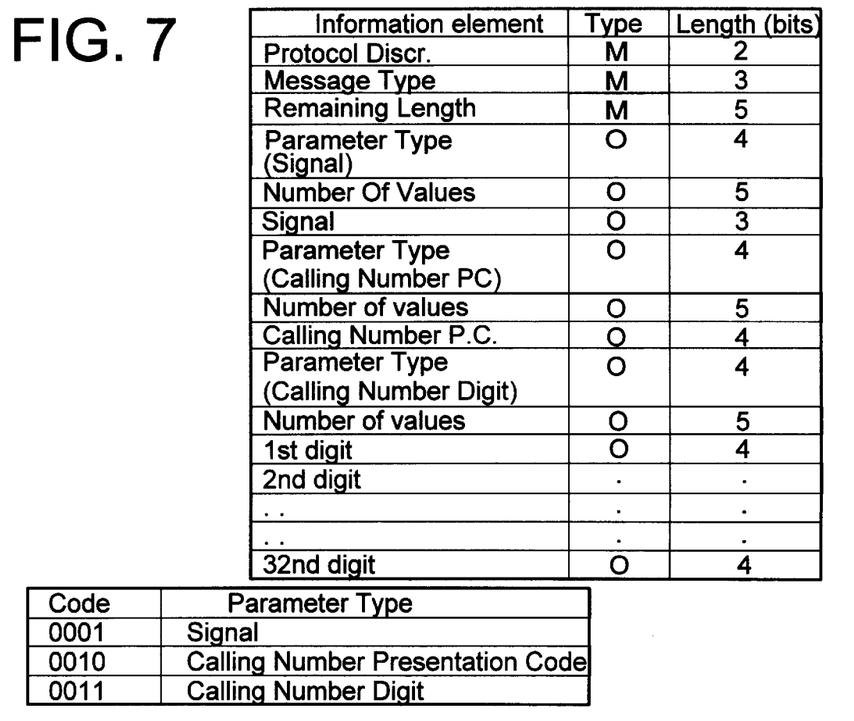
FIG. 7 illustrates an example of a message sent from the radio base station to the radio terminal for alerting the subscriber according to one embodiment of the present invention.

FIG. 7 illustrates an example of a message sent from the radio base station to the radio terminal for alerting the subscriber according to one embodiment of the present invention. The message shown in FIG. 7 is an ALERT WITH INFO message according to the IS-54 standard. This message causes the telephones to ring, alerting the subscriber. This message is the same whether or not there is already an ongoing call, because the ringing telephones indicate an incoming call in the same manner regardless of whether a call is already going on or not. In the adaptor 340, the ring signal generator 342 directs the alerting or ringing only to designated telephones that are on-hook.

The radio terminal according to the present invention may have a variety of applications. For example, the radio terminal may be used in a Global System for Communication (GSM) system. In the GSM system, there are eight time slots available on each carrier frequency, allowing eight simultaneous calls via one RLL radio terminal.

The radio terminal may, alternatively, be used in a DAMPS (Digital American Mobile Phone System) system. In the DAMPS system, there are three time slots available on each carrier frequency, allowing three simultaneous calls via one RLL radio terminal.

The RLL network may, for example, be superimposed over existing wire-bound networks to provide functions not available in the wire-bound network.

The present invention may also be applied to Private Automatic Branch Exchanges (PABXs), in particular to small PABXs. Unlike wire-bound PABXs which normally have dedicated means for control signalling, a PABX with a radio air-interface according to the present invention is provided with control signalling via dedicated means only when setting up the first call, whereas all subsequent simultaneous calls are handled by signalling via an earlier established traffic connection.

The present invention has been described above with reference to TDMA. An advantage of using TDMA is that the radio terminal equipment may be shared by multiple calls. However, the present invention may also be implemented with Code Division Multiple Access (CDMA), in which different codes are assigned to different calls. Alternatively, Frequency Division Multiple Access (FDMA) may be used, in which different calls are assigned different frequencies. While CDMA and FDMA require some separate equipment for multiple calls, much of the radio terminal equipment may still be shared for conducting multiple calls simultaneously according to the present invention.

It will be appreciated by those skilled in the art that the present invention can be embodied in other specific forms without departing from the spirit or essential characteristics thereof. For example, although the embodiments above have been described as applicable to digital RLL, the invention is also applicable to analog RLL. Also, although the embodiments above have been described with reference to POTs, other subscriber terminals may be used instead of at least some of the POTs, such as, for example, personal computers, facsimile machines, or cordless telephones. The presently disclosed embodiments are therefore considered in all respects to be illustrative and not restrictive. The scope of the invention is indicated by the appended claims, rather than the foregoing description, and all changes that come within the meaning and range of equivalence thereof are intended to be embraced therein.

What is claimed is:

1. In a radio communication system including at least one radio base station and at least two subscriber terminals connected to one radio terminal, a method of setting up multiple independent calls between the radio base station and the at least two subscriber terminals via the radio terminal, the method comprising the steps of: signalling on a control channel between the radio base station and the radio terminal for setting up a first independent call between the radio base station and one of the at least two subscriber terminals;

setting up said first independent call across a traffic channel between the radio base station and the radio terminal; and setting up a second independent call between the radio base station and another one of the at least two subscriber terminals, without terminating the first call, by signalling over the traffic channel already established for said first independent call.

2. A radio terminal for handling simultaneously at least two independent calls between at least two subscriber terminals connected to the radio terminal and a radio base station, the radio terminal comprising:

means for signalling over a control channel for setting up a first independent call across a first traffic channel; and means for signalling over the first traffic channel for setting up a second independent call across a second traffic channel.

3. The radio terminal of claim 2, wherein the first independent call and the second independent call are set up on different time slots on the same carrier frequency of a time division multiple access (TDMA) system.

4. In a radio communication system, a private branch exchange connectable to a public switched telephone network via a radio air-interface with at least one control channel and at least two traffic channels, the private branch exchange comprising:

means for signalling over the at least one control channel for setting up a first independent call across a first traffic channel; and means for signalling over said first traffic channel for setting up a second independent call on a second traffic channel.

5. The private branch exchange of claim 4, wherein the first call and the second call are set up on different time slots on the same carrier frequency of a time division multiple access (TDMA) system.

6. In a radio communication system including at least one radio base station connected via a radio air-interface to a radio terminal, an adaptor for connecting at least two subscriber terminals to the at least one radio base station via the radio terminal and the radio air-interface, the adaptor comprising:

detector means for detecting when a first of the at least two subscriber terminals goes off-hook and generating a first hook signal; and access means for receiving said first hook signal, requesting on a control channel, via the radio terminal and the radio air-interface, that a first traffic channel be set up between the radio terminal and the radio base station, and connecting the first of the at least two subscriber terminals across the first traffic channel, wherein if said detector means detects that a second of the at least two subscriber terminals has gone off-hook, said detector means generates a second hook signal and said access means receives said second hook signal, requests on the first traffic channel that a second traffic channel be set up between the radio terminal and the radio base station, and connects the second of the at least two subscriber terminals across the second traffic channel.

7. The adaptor of claim 6, further comprising:

means for receiving an alert order from said radio base station via said radio terminal and said access means and providing a ring signal to those of said at least two subscriber terminals that have not gone off-hook, wherein when said access means receives a hook signal from said detector means, said access means requests a traffic channel for an outgoing connection if said alert order has not been received and requests a traffic channel for an incoming connection if said alert order has been received.

8. The adaptor of claim 6, wherein when a subscriber terminal is connected across a traffic channel, via the radio terminal and the radio air-interface, to the radio base station, the access means receives subscriber signalling from the subscriber terminal and transmits the subscriber signalling on the traffic channel across which the subscriber terminal is connected.

9. The adaptor of claim 8, wherein the subscriber signalling is Dual Tone Multiple Frequency (DTMF) when provided by the subscriber terminal.

10. In a radio communication system including at least one radio base station connected via a radio air-interface to a radio terminal, a method of signalling over the radio air-interface for setting up multiple independent calls between the at least one radio base station and at least two subscriber terminals connected to the radio terminal, the method comprising the steps of:

transmitting line signals over the radio air-interface across a control channel for setting up a first independent call between the radio base station and one of the at least two subscriber terminals, wherein said first independent call is set up across a traffic channel via the radio air-interface; and transmitting line signals over the radio air-interface across the traffic channel already established for said first independent call for setting up a second independent call between the radio base station and another one of the at least two subscriber terminals.

11. The method of claim 10, wherein said line signals include at least one among off-hook signals transmitted from the radio terminal to the radio base station and alert signals transmitted from the radio base station to the radio terminal.

12. A radio base station for handling simultaneously at least two independent calls between at least two subscriber terminals connected to a radio terminal and the radio base station, the radio base station comprising:

means for signalling over a control channel for setting up a first independent call across a first traffic channel; and means for signalling over the first traffic channel for setting up a second independent call across a second traffic channel.

13. The radio base station of claim 12, wherein the first independent call and the second independent call are set up on different time slots on the same carrier frequency of a time division multiple access (TDMA) system.

14. A radio communication system for handling multiple independent calls, comprising:

at least one radio base station;

a radio terminal connected via a radio air-interface to said at least one radio base station;

an adaptor connected to said radio terminal; and at least two subscriber terminals connected to said radio terminal via said adaptor, wherein said at least one radio base station and said radio terminal signal on a control channel over the radio air-interface for setting up a first independent call across a first traffic channel, and said at least one radio base station and said radio terminal signal on the first traffic channel over the radio air-interface for setting up a second independent call across a second traffic channel.

* * * * *